United States Patent [19]

Krupick

[11] 4,270,392

[45] Jun. 2, 1981

[54] LOW COST FLEXURE ASSEMBLY

[75] Inventor: Walter J. Krupick, Succasuna, N.J.

[73] Assignee: The Singer Company, Little Falls, N.J.

[21] Appl. No.: 941,990

[22] Filed: Sep. 13, 1978

Related U.S. Application Data

[63] Continuation of Ser. No. 716,602, Aug. 23, 1976, abandoned.

[51] Int. Cl.³ ............................................ G01C 19/18
[52] U.S. Cl. ...................................................... 74/5 F
[58] Field of Search ...................... 74/5 F; 308/2 A; 64/15 B

[56] References Cited

U.S. PATENT DOCUMENTS

| | | | |
|---|---|---|---|
| 3,354,726 | 11/1967 | Krupick et al. | 74/5.7 X |
| 3,585,866 | 6/1971 | Ensinger | 308/2 A X |
| 3,614,894 | 10/1971 | Ensinger | 308/2 A X |
| 3,700,290 | 10/1972 | Ensinger | 308/2 A |
| 3,709,045 | 1/1973 | Krupick et al. | 74/5 F |
| 3,844,137 | 10/1974 | Zugel | 308/2 A X |
| 3,856,366 | 12/1974 | Weisbord et al. | 74/5 F X |

Primary Examiner—Rodney H. Bonck
Attorney, Agent, or Firm—John C. Altmiller; Thomas W. Kennedy

[57] ABSTRACT

A low cost, simple to manufacture, two axis gyro having an outer flexure assembly and an inner flexure assembly. Each flexure assembly contains two flexure hinges which represent a reduction in the number of hinges and milled cuts from those required in prior art devices. The inner flexure assembly is designed to nest within the outer flexure assembly and both are mounted centrally on a rotatable shaft for rotation about the gyro spin axis. The two flexures of the outer assemblies are separated 180° from each other and adjacent to two slots also separated by 180° in the rim of the outer gimbal. Likewise, the two flexures of the inner flexure assembly are separated 180° from each other and 90° from each of the outer flexures. The outer flexure assembly axis is offset axially by a controlled amount from the inner flexure assembly axis to achieve nominal balance on both flexure axes.

6 Claims, 8 Drawing Figures

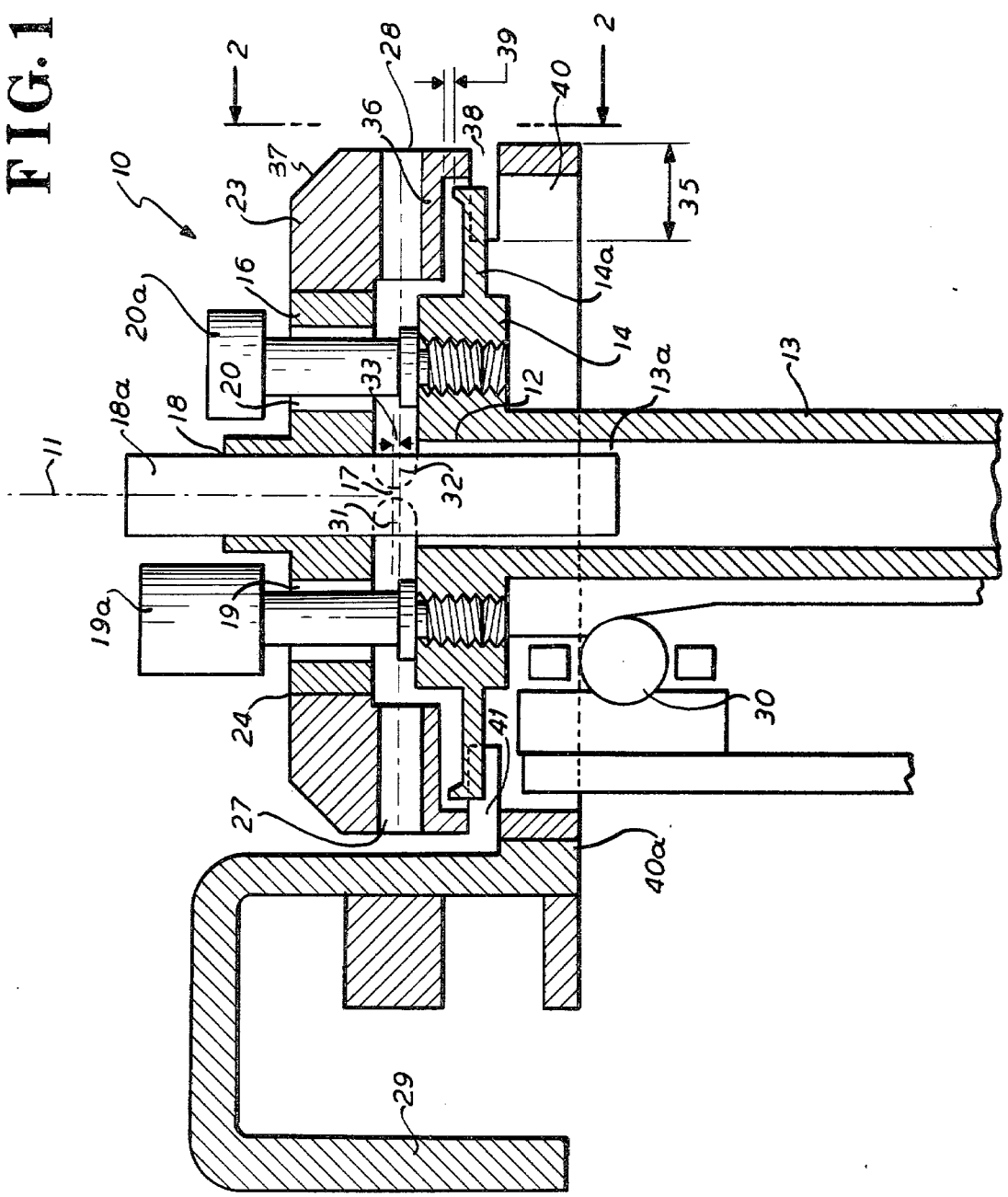

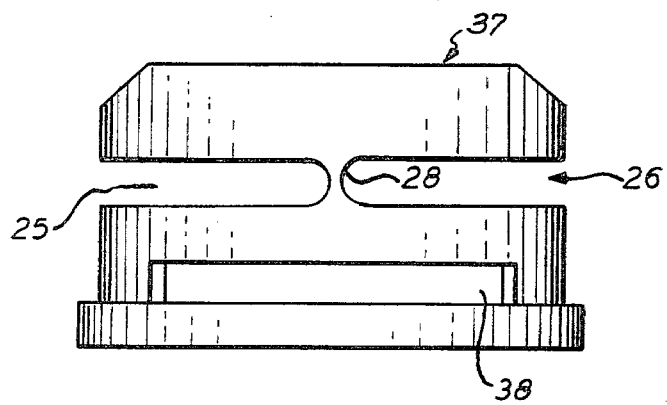
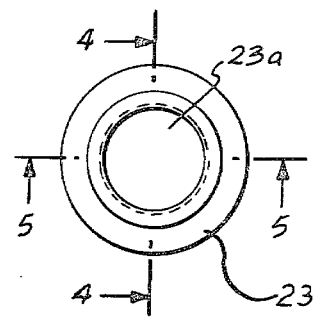
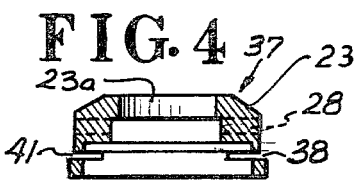
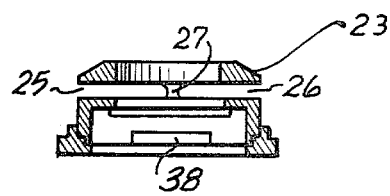
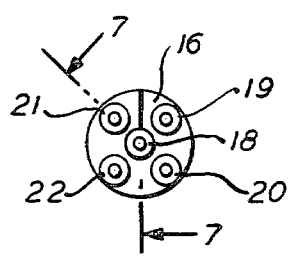
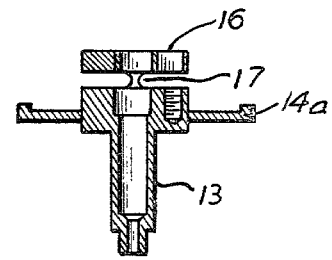
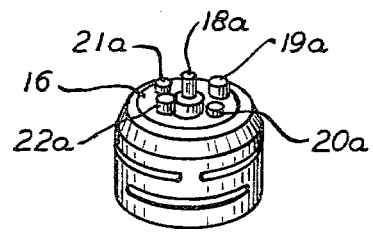

LOW COST FLEXURE ASSEMBLY

This is a continuation of application Ser. No. 716,602, filed Aug. 23, 1976 and now abandoned.

This invention is related to a two-degree-of-freedom gyro. More particularly, this invention relates to a low cost, two axis flexure assembly for a two axis, tuned rotor gyro.

BACKGROUND OF THE INVENTION

There are in the prior art many variations of two axis flexures. One variation is disclosed in U.S. Pat. No. 3,354,726, entitled "Two-Axis Gyro" and issued to W. J. Krupick and R. F. Cimera and assigned to the same assignee as the present invention.

The above patent describes a free-rotor type gyroscope having a flexure hinge for interconnecting the gyro rotor to a driven motor shaft. The flexure suspension comprises an inner hinge unit fixedly connected to an outer hinge unit in a generally concentric and parallel manner. Each hinge unit is composed of three gimbals; namely, an upper, middle, and lower and has two quadrature pairs of oppositely disposed flexure bars for interconnecting the gimbals and for permitting relative tilting of the gimbals about any transverse axis perpendicular to the hinge's central axis. The upper gimbals of the respective hinge units are fixedly coupled together and to the gyro's rotor, whereas the lower gimbals of the two hinge units are fixedly connected to each other and to the gyro's spin shaft, respectively. The inner hinge provides high stiffness axially, i.e., along the gyro's spin axis. The outer hinge is designed to provide radial stiffness along the plane perpendicular to the spin axis. In the above device, each flexure assembly had four flexures made by grinding two adjacent holes and/or gimbals made selective by selective milled cuts.

BRIEF DESCRIPTION OF THE INVENTION

The present invention provides a low cost, two axis flexure assembly for a two axis, tuned rotor gyro which requires less flexure webs as well as fewer milled cuts. As stated above, most prior art devices require four flexure webs per flexure axis resulting in eight flexures for the two axes. The present invention reduces the number of flexures to two per axis or four flexures. An additional advantage of the present invention is that the construction allows the flexure of the outer and inner assemblies to be ground at the same time providing fewer milled cuts.

The two axis gyro of the present invention comprises flexure and wheel assemblies having an outer flexure assembly comprising an outer gimbal having a circular configuration with two flexure hinges 180° apart on its outer rim and two slots also 180° apart radially aligned with the two outer flexure hinges. An inner flexure assembly comprising an inner gimbal coaxially nested within the outer gimbal containing two inner flexure hinges 180° apart and separated 90° from the outer flexure hinge pair. The combined outer and inner hinge assemblies are centrally mounted on a drive shaft which also centrally supports the gyro flywheel for rotation about the gyro spin axis. Suitable drive means employing bearings, and a motor are provided for rotation of the gyro rotor. Trim weights are provided to adjust the gimbal unbalance and inertia. The outer flexure assembly axis is offset axially by a controlled amount from the inner flexure assembly axis to achieve nominal balance on both flexure axes.

Accordingly, it is an object of this invention to provide a low cost, two axis flexure assembly for a two axis tuned rotor gyro.

It is another object of this invention to provide a low cost, two axis flexure gyro wherein the number of flexures and milled cuts are substantially reduced.

These and other objects, features, and advantages of the present invention will become apparent from the following description taken in conjunction with the accompanying drawings (not to scale) wherein:

FIG. 1 is an elevational view showing the essential features of the two axis flexure gyro of the invention omitting the housing, the drive mechanism and other structure nonessential to the understanding of the invention;

FIG. 2 is a fragmentary view of the outer flexure assembly taken along 2—2 of FIG. 1;

FIG. 3 is a top plan view of the outer flexure assembly;

FIG. 4 is a view of the outer flexure assembly taken along the line 4—4 of FIG. 3 showing the slots in the rim of the outer gimbal;

FIG. 5 is a view of the outer flexure taken along the line 5—5 of FIG. 3 showing one of the outer hinge flexures;

FIG. 6 is a top plan view of the inner flexure assembly;

FIG. 7 is a view taken along the line 7—7 of FIG. 6 showing one of the inner hinge flexures; and FIG. 8 is a perspective view of the flexure assembly.

Referring now to FIG. 1, the assembled flexure and wheel assembly 10 is shown. It consists of an inner flexure assembly 12. The inner flexure assembly 12 comprises a shaft portion 13 integral with a flange portion 14. Flange 14 is coaxial with spin axis 11. Shaft 13 also has a through bore 13a. Inner gimbal 16 of the inner flexure assembly has a diameter essentially equal to flange portion 14 and is axially spaced therefrom by inner flexures 15 and 17. Inner flexure 15 lies opposite flexure 17 but is not shown in the drawing. Flexures 15 and 17 are separated by an interior gap as the shaft 13 is hollow and the flexures 15 and 17 are formed on the periphery of shaft 13. Inner gimbal 16 contains five bores, a central bore 18 and four peripheral bores 19, 20, 21, and 22 which are separated 90° from each other. Trim weight 18a is insertable in bore 18. Likewise, trim weights 19a, 20a, 21a, and 22a are insertable in bores 19, 20, 21, and 22, respectively. An extended flange portion 14a extends laterally from flange portion 14 in a plane substantially parallel to section 36 of the wheel support rim 40. The outer flexure assembly 37 has two slots, 25 and 26, situated 180° from each other, and best seen in FIG. 2, which form the outer flexures 27 and 28 and join outer gimbal 23. Outer gimbal 23 has an essentially circular shape with a central opening 23a into which the inner gimbal 16 is nested. Gimbal 23 and 16 are joined by either cementing, welding, or brazing. A downwardly depending portion 36 of the bottom rim of wheel support rim 40 cooperates with extended flange portion 14a to serve as a stop.

Flywheel or rotor 29, shown fragmentally in FIG. 1, is joined to wheel support rim 40 at 40a. It has a circular configuration and is mounted coaxially about spin axis 11 surrounding the flexure assemblies by an opening in its central portion. Also shown fragmentally in FIG. 1 is bearing assembly 30 positioned on lower part of shaft 13.

The two outer flexures 27, 28 and the two inner flexures 15, 17 are made by machining two adjacent slots to achieve the desired thickness and cross section. As shown, this is a radius, but it may be a more complex contour. The flexure radii are made small to achieve relatively high stiffness across the plane of the flexures. Each flexure provides support both radially and axially. The flexures are still much stiffer axially. Slots 38, 41 in the outer flexure assembly provide additional compliance in the axial direction to achieve anisoelasticity. Slot 41 is not shown in FIG. 2, but is opposite slot 38.

As stated above, gimbals 16 and 23 are positioned with the flexure hinges 90° to each other. The inner flexure axis plane 31 is in a plane orthogonal to both the outer flexure axis plane 32 and spin axis plane 11. For example, in an X,Y,Z, coordinate axis system we could locate the inner axis 31 along the X axis, the outer flexure axis 32 along the Y axis and the spin axis 11 along the Z axis. In operation, the inner flexure axis plane 31 can be said to tilt rotor 29 in a first flexure plane perpendicular to the spin axis plane and the outer flexure axis plane 32 tilts rotor 29 in a second flexure plane perpendicular to the spin axis plane. The axes of the inner and outer flexures are spaced a controlled distance 33 by mounting of inner gimbal 16 and outer gimbal 23 on shaft 13 to achieve nominal balance on both flexure axes. This condition is achieved when the center of gravity of the wheel assembly or rotor 29 is nominally on the outer flexure axis 32 and the moment due to the gimbal mass relative to inner flexure axis 31 is balanced by the moment due to wheel mass and flexure axis spacing.

As shown in FIG. 1, stop 14a is integral with the inner flexure assembly 12. This arrangement, which is the lowest cost, can be used as long as the stop clearance space 39 is equal to or larger than the flexure axis spacing 33.

The construction shown allows the flexures of both assemblies to be ground at the same time. To accomplish this, the outer assembly is clamped to the inner assembly against a fixture and the flexure slots and radius are ground in place. The flexure assemblies are then rotated 90° to each other and separated the nominal distance to achieve gimbal balance, which in some cases could be the proper stop clearance.

The depth 35 of slot 38 and the configuration of cross section 36 are designed to achieve the desired axial compliance with minimum resulting angular rotation of this section due to axial force.

Dynamic balancing relative to the bearing can be accomplished by adjusting the mass of the weights 18a, 19a, 20a, 21a, and 22a. Nominally, there are four of these weights.

The flexure assembly operation is similar to the operation of the two axis flexure assembly described in U.S. Pat. No. 3,354,726 for tuned rotor gyros. The inertia of the gimbal is adjusted so that the reaction torque due to the gimbal tilt and its rotational speed which is $(J_x+J_y-J_z)(\omega^2/2)$ is equal to the flexure torque $(K_x+K_y)/2$
where:

$J_x$ = inertia of gimbal with respect to x axis
$J_y$ = inertia of gimbal with respect to y axis
$J_z$ = inertia gimbal with respect to z axis
$K_x$ = angular spring rate around x axis
$K_y$ = angular spring rate around y axis
$\omega$ = rotational speed in radians per second From the foregoing, a low cost, simple to manufacture, two axis flexure assembly for a two axis tuned rotor gyro has been described in which the number of flexures and milled cuts have been reduced. Moreover, it has been shown that to make the flexures, only two slots have to be ground compared to requiring 16 ground holes and a large number of milled cuts for a typical high performance flexure assembly.

While a particular embodiment of the invention has been shown and described, modifications may be made and it is intended in the following claims to cover the embodiments which fall within the true spirit and scope of the invention.

What is claimed is:

1. A two axis flexure assembly for a two axis, tuned, rotor gyro comprising:
   first means having only two flexures separated by 180° from each other for tilting said gyro rotor in a first flexure plane perpendicular to the spin axis plane of said gyro,
   second means nested within a central opening of said first means and having only two flexures separated 180° from each other, said flexures of said second means being also separated 90° from said flexures of said first means, said second means tilting said gyro rotor in a second flexure plane orthogonal to both said first flexure plane and said gyro spin axis plane, said first and second flexure planes being axially spaced by a predetermined distance from each other;
   means mounted on said second means for adjusting the unbalance and inertia of said gyro; and
   a transverse slot in said first means below each of said two flexures.

2. The two axis flexure assembly of claim 1 comprising:
   means integral with said second means for limiting the angular deflection of said gyro.

3. A two axis flexure assembly for a two axis gyro having a rotor wheel comprising:
   a bearing shaft lying in a plane parallel to the plane of the spin axis of the rotor wheel, said shaft having a radially flared flange portion at its end,
   a rotor wheel support,
   an inner gimbal mounted centrally of said shaft in a plane perpendicular to said shaft and in coaxial relation with said flared flange portion of said shaft and forming an inner flexure hinge, consisting of two web portions, connected to said shaft and separated from each other by an interior gap formed in said shaft, and
   an outer gimbal mounted centrally of said shaft and having said inner gimbal nested within a central opening in said outer gimbal, said outer gimbal forming an outer flexure hinge consisting of two web portions spaced 180° apart, said wheel support mounted on said outer gimbal and said flexures of said inner and outer gimbals being situated 90° from each other, each of said inner and outer gimbals having a flexure plane orthogonal to the plane of said spin axis and to the flexure plane of each other, said flexure planes of said inner and outer gimbals also being axially spaced from each other to insure inertial balance, said outer gimbal also having a pair of transverse slots located in its rim and positioned beneath the web portions of said outer flexure hinge, said slots providing additional compliance in the axial direction to achieve anisoelasticity, and means mounted on said inner gimbal for adjusting gimbal unbalance and inertia.

4. The two axis gimbal of claim 3 comprising:

means integral with said inner flexure assembly for limiting the angular deflection of said gyro.

5. A two axis flexure assembly for a two axis gyro rotor comprising:

a bearing shaft lying in a plane parallel to the plane of the spin axis of said rotor, said shaft having a radially flared flange portion at its upper end, an inner flexure assembly mounted centrally of said shaft in a plane perpendicular to the plane of said shaft, said inner flexure assembly comprising an inner gimbal mounted in a coaxial relation to said flared portion of said shaft and forming an inner flexure hinge oriented in a first flexure plane and having only two web portions, connected to said shaft and separated from each other by an interior gap formed in said shaft, an outer flexure assembly mounted centrally of said shaft and comprising an outer gimbal having said inner gimbal nested within a central opening therein, said outer gimbal having only two web portions 180° apart forming an outer flexure hinge oriented in a second flexure plane, said web portions of said outer gimbal being situated 90° from said web portions of said inner gimbal, said first and second flexure planes being axially separated from each other by a controlled amount, and a pair of transverse slots located in the rim of said outer flexure assembly and positioned beneath said web portions of said outer flexure hinge, said slots providing additional compliance in the axial direction to achieve anisoelasticity.

6. The two axis flexure assembly of claim 5 comprising:

a plurality of trim weights located on said inner gimbal for adjusting gimbal unbalance and inertia.

* * * * *